US012234678B2

(12) United States Patent
van Mourik

(10) Patent No.: US 12,234,678 B2
(45) Date of Patent: Feb. 25, 2025

(54) CONTROL UNIT AND METHOD FOR OPERATING AN OPEN ROOF ASSEMBLY

(71) Applicant: Inalfa Roof Systems Group B.V., Oostrum (NL)

(72) Inventor: Marco van Mourik, Ravenstein (NL)

(73) Assignee: INALFA ROOF SYSTEMS GROUP B.V., Oostrum (NL)

( * ) Notice: Subject to any disclaimer, the term of this patent is extended or adjusted under 35 U.S.C. 154(b) by 222 days.

(21) Appl. No.: 17/545,679

(22) Filed: Dec. 8, 2021

(65) Prior Publication Data

US 2022/0186545 A1     Jun. 16, 2022

(30) Foreign Application Priority Data

Dec. 10, 2020   (EP) ..................................... 20213215

(51) Int. Cl.
  *B60J 7/02*      (2006.01)
  *E05F 15/41*     (2015.01)
  *E05F 15/643*    (2015.01)

(52) U.S. Cl.
  CPC ................ *E05F 15/41* (2015.01); *B60J 7/02* (2013.01); *E05F 15/643* (2015.01); *E05Y 2201/434* (2013.01); *E05Y 2201/654* (2013.01); *E05Y 2400/40* (2013.01); *E05Y 2400/44* (2013.01);
(Continued)

(58) Field of Classification Search
  CPC ........... E05Y 2900/542; E05Y 2400/40; E05Y 2400/44; E05Y 2400/54; E05F 15/73; E05F 15/71
  See application file for complete search history.

(56) References Cited

U.S. PATENT DOCUMENTS 4,870,333 A * 9/1989 Itoh ....................... E05F 15/695
                                              318/266
5,689,160 A * 11/1997 Shigematsu ............ E05F 15/41
                                              318/281
(Continued)

FOREIGN PATENT DOCUMENTS

CN       113276644 A  *  8/2021 ................ B60J 7/04
DE       3136746 A1       6/1983
(Continued)

OTHER PUBLICATIONS

"Performance evaluation of MPPT techniques for PV array incorporated into Electric Vehicle roof;" Sarigiannidis et al., 2015 International Conference on Renewable Energy Research and Applications (ICRERA) (pp. 1069-1073); Nov. 1, 2015. (Year: 2015).*

(Continued)

*Primary Examiner* — Khoi H Tran
*Assistant Examiner* — Jorge O Peche
(74) *Attorney, Agent, or Firm* — Steven M. Koehler; Westman, Champlin & Koehler, P.A.

(57) ABSTRACT

A control unit for operating a moveably arranged closure member of an open roof assembly comprises at least one computing resource for executing a computing process. The control unit is configured to interrupt a running first computing process and to execute a second computing process for controlling at least a part of a closing movement of the closure member. The first computing process may be restarted when the closing movement is stopped.

20 Claims, 6 Drawing Sheets

(52) U.S. Cl.
CPC ..... *E05Y 2400/54* (2013.01); *E05Y 2900/542* (2013.01)

(56) References Cited

U.S. PATENT DOCUMENTS

| | | | | |
|---|---|---|---|---|
| 5,955,854 | A * | 9/1999 | Zhang | E05F 15/431 340/901 |
| 6,049,792 | A * | 4/2000 | Hart | G06F 9/453 706/11 |
| 6,081,088 | A * | 6/2000 | Ishihara | E05F 15/44 318/467 |
| 6,404,158 | B1 * | 6/2002 | Boisvert | H02H 7/0851 318/565 |
| 6,555,978 | B1 * | 4/2003 | Castellon | H02H 7/0851 318/266 |
| 6,573,678 | B2 * | 6/2003 | Losey | G01M 3/12 318/470 |
| 6,794,837 | B1 * | 9/2004 | Whinnery | E05F 15/41 318/266 |
| 6,936,984 | B2 * | 8/2005 | Wilson | G05B 19/4145 318/264 |
| 7,178,167 | B1 * | 2/2007 | Katoh | G06F 21/575 726/16 |
| 7,259,532 | B2 * | 8/2007 | Shinohara | H02P 7/04 318/443 |
| 7,268,506 | B2 * | 9/2007 | Nakagawa | E05F 15/695 318/284 |
| 7,436,136 | B2 * | 10/2008 | Rhodes | E05F 15/431 318/369 |
| 7,489,095 | B2 * | 2/2009 | Pebre | H02H 7/0851 318/283 |
| 8,627,600 | B2 * | 1/2014 | Gao | E05F 15/42 49/26 |
| 8,704,476 | B2 * | 4/2014 | Egger | H02H 7/0851 318/266 |
| 9,576,039 | B2 * | 2/2017 | Dageville | G06F 16/148 |
| 10,060,171 | B2 | 8/2018 | Aoshima | |
| 11,782,699 | B1 * | 10/2023 | Meyers | G06F 8/65 717/171 |
| 2002/0101210 | A1 * | 8/2002 | Boisvert | H02H 7/0851 318/469 |
| 2003/0122516 | A1 * | 7/2003 | Mukai | B60J 7/0573 318/468 |
| 2003/0222610 | A1 * | 12/2003 | Whinnery | H02H 7/0851 318/362 |
| 2004/0183493 | A1 * | 9/2004 | Boisvert | H02H 7/0851 318/469 |
| 2005/0017667 | A1 * | 1/2005 | Yamamoto | H02H 7/0851 318/469 |
| 2006/0028162 | A1 * | 2/2006 | Iwasaki | E05F 15/695 318/280 |
| 2006/0290309 | A1 * | 12/2006 | Saitou | H02H 7/0851 318/469 |
| 2007/0003258 | A1 * | 1/2007 | Franzan | H02H 7/0851 318/610 |
| 2007/0084120 | A1 * | 4/2007 | Kobayashi | G05B 19/4061 49/27 |
| 2007/0119100 | A1 * | 5/2007 | Nakada | E05F 15/695 49/350 |
| 2008/0036406 | A1 * | 2/2008 | Kawai | E05F 15/695 318/283 |
| 2008/0074067 | A1 * | 3/2008 | Rhodes | E05F 15/431 318/280 |
| 2008/0297076 | A1 * | 12/2008 | Sakai | E05F 15/41 700/47 |
| 2009/0051513 | A1 * | 2/2009 | Naito | E05F 15/41 340/426.28 |
| 2009/0058340 | A1 * | 3/2009 | Sakai | G05B 9/02 318/434 |
| 2009/0206784 | A1 * | 8/2009 | Inoue | E05F 15/695 318/434 |
| 2009/0243528 | A1 * | 10/2009 | Ubelein | E05F 15/697 318/454 |
| 2009/0272035 | A1 * | 11/2009 | Boisvert | B60J 7/0573 49/28 |
| 2009/0295556 | A1 * | 12/2009 | Inoue | E05F 15/695 49/506 |
| 2010/0083579 | A1 * | 4/2010 | Kigoshi | E05F 15/40 49/358 |
| 2010/0107502 | A1 * | 5/2010 | Okada | F16D 37/008 49/349 |
| 2011/0071735 | A1 * | 3/2011 | Witek | E05F 15/41 701/49 |
| 2012/0151840 | A1 * | 6/2012 | Scheler | E05B 81/14 49/358 |
| 2012/0192491 | A1 * | 8/2012 | Katayama | E05F 15/695 49/324 |
| 2012/0198770 | A1 * | 8/2012 | Katayama | E05F 15/70 49/28 |
| 2013/0276748 | A1 * | 10/2013 | Kromer | H02H 7/0851 123/319 |
| 2013/0340341 | A1 * | 12/2013 | Shibata | E05F 15/40 49/31 |
| 2014/0083011 | A1 * | 3/2014 | Sumiya | E05F 15/40 49/28 |
| 2014/0207343 | A1 * | 7/2014 | Kigoshi | E05F 15/695 701/49 |
| 2015/0360545 | A1 * | 12/2015 | Nania | B60J 7/0573 296/223 |
| 2016/0153226 | A1 | 6/2016 | Aoshima | |
| 2017/0327070 | A1 * | 11/2017 | Schmidt | B60R 21/12 |
| 2018/0187472 | A1 * | 7/2018 | Ikeda | E05F 15/73 |
| 2018/0241810 | A1 * | 8/2018 | Lerzer | H04L 67/10 |
| 2018/0328095 | A1 * | 11/2018 | Kobayashi | B60J 1/00 |
| 2019/0169917 | A1 * | 6/2019 | Kito | E05F 15/73 |
| 2020/0031207 | A1 * | 1/2020 | Henes | H02P 21/36 |
| 2020/0383066 | A1 * | 12/2020 | Gutierrez | H04W 52/346 |
| 2021/0254386 | A1 * | 8/2021 | Craane | E05F 15/443 |
| 2021/0306281 | A1 * | 9/2021 | Vilgelm | H04L 47/781 |
| 2021/0374319 | A1 * | 12/2021 | Gibson | G06F 9/5027 |
| 2022/0004174 | A1 * | 1/2022 | Kaira | G06F 18/23 |
| 2022/0123570 | A1 * | 4/2022 | Fuchs | B60L 53/66 |
| 2022/0154511 | A1 * | 5/2022 | Romaszko | E05F 15/40 |
| 2022/0158573 | A1 * | 5/2022 | Romaszko | H02P 3/06 |
| 2023/0030905 | A1 * | 2/2023 | Mao | H04W 8/18 |
| 2023/0191878 | A1 * | 6/2023 | Schmidt | B60H 1/00428 454/69 |

FOREIGN PATENT DOCUMENTS

| | | | | |
|---|---|---|---|---|
| DE | 20205496 | U1 * | 5/2003 | ......... H02H 7/0851 |
| DE | 102016101487 | B4 * | 11/2023 | ............. B60J 1/08 |
| EP | 1031696 | A2 * | 8/2000 | ........... E05F 15/443 |
| EP | 3503333 | A1 * | 6/2019 | ............. B60J 1/12 |
| EP | 3868992 | A1 * | 8/2021 | ............. B60J 7/04 |
| JP | S63217339 | A * | 9/1988 | |
| JP | H1181797 | A | 3/1999 | |
| JP | H11159245 | A * | 6/1999 | |
| JP | 2016047685 | A * | 4/2016 | |
| JP | 6413810 | B2 * | 10/2018 | ............. B60J 1/08 |
| KR | 20160115171 | A * | 10/2016 | |

OTHER PUBLICATIONS

"JUPITER—ROS based Vehicle Platform for Autonomous Driving Research;" Haselberger et al., 2022 IEEE International Symposium on Robotic and Sensors Environments (ROSE) (pp. 1-8); Nov. 14, 2022. (Year: 2022).*

"Extensive Tests of Autonomous Driving Technologies;" Broggi et al., IEEE Transactions on Intelligent Transportation Systems (vol. 14, Issue: 3, pp. 1403-1415); Sep. 27, 2013. (Year: 2013).*

European Search Report in corresponding European Patent Application No. 20213215.5 dated Apr. 29, 2021, 8 pages.

* cited by examiner

CONTROL UNIT AND METHOD FOR OPERATING AN OPEN ROOF ASSEMBLY

BACKGROUND

The discussion below is merely provided for general background information and is not intended to be used as an aid in determining the scope of the claimed subject matter.

Aspects of the invention relate to a control unit and a method for operating a moveably arranged closure member of an open roof assembly. Further, the present invention relates to an open roof assembly comprising the control unit.

In a known open roof assembly, a moveably arranged closure member is arranged and configured to, in a closed state, cover an opening in a roof of a vehicle. Further, in an open state, the closure member is configured to at least partially uncover the opening in the vehicle roof.

In a closing movement an object may be pinched or get stuck between the closure member and an edge of the opening in the vehicle roof. For safety reasons, legal requirements are applicable in many jurisdictions with respect to a maximum force that may be exerted by the closure member during a movement. Hence, a control unit in the known open roof assembly is configured to detect an unintended change during a closing movement of the closure member or at least a part of the closing movement, wherein upon a suspected obstruction or pinch, the closing movement is stopped and usually even reversed.

The detection of an unintended change in the closing movement may be detected by analysis of a number of properties of the closure member and an electrical-mechanical drive system for moving the closure member. For example, a drive current supplied to an electric drive motor may be analysed in combination with a rotational speed of the electric drive motor. Upon an obstruction, the supplied drive current may increase, while a rotational speed decreases, as a result of which an exerted force may increase rapidly.

With the possibility to operate a closure member of the open roof assembly remotely, e.g. through a remote controller or a smartphone, or with the possibility to automatically close the closure member depending on weather conditions, e.g. upon detection of rain or snow, it has become possible to close the closure member without direct supervision. Under such circumstances, the legal requirement may be more stringent. To meet such legal requirements, processing capacity may need to be relatively high to reliably detect as early as possible any significant change in the closing movement. The sooner a possible obstruction is detected, the lower any force exerted on the object that is pinched. On the other hand, increased processing capacity requires significantly more expensive computing resources.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

As will be appreciated by one skilled in the art, aspects of the present invention may be embodied as a system, method or computer program product. Accordingly, aspects of the present invention may take the form of an entirely hardware embodiment (analog and/or digital components), an entirely software embodiment (including firmware, resident software, micro-code, etc.) or an embodiment combining software and hardware aspects that may all generally be referred to herein as a "circuit," "module" or "system". Functions described in this disclosure may be implemented as an algorithm executed by a microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, an optical storage device, a magnetic storage device, or any suitable combination of the foregoing. In the context of this document, a computer readable storage medium may be any tangible medium that can comprise, or store a program for use by or in connection with an instruction execution system, apparatus, or device.

Computer program code for carrying out operations for aspects of the present invention may be written in any combination of one or more programming languages, including a functional or an object oriented programming language such as but not limited to Java™, Scala, C++, or the like and conventional procedural programming languages, such as the "C" programming language or similar programming languages.

Aspects of the present invention are described below with reference to flowchart illustrations, block diagrams and/or timing diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by analog or digital components, or computer program instructions. These computer program instructions may be provided to a computer resource such as a processor, in particular a microprocessor or central processing unit (CPU), a special purpose computer, or other programmable data processing apparatus to produce a machine, such that the instructions, which can be stored in memory or the like, and which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In a first aspect, a control unit is configured for operating a moveably arranged closure member of an open roof assembly and comprises at least one computing resource for executing a computing process. The control unit is configured to interrupt a running first computing process, to execute a second computing process for controlling at least a part of a closing movement of the closure member and to restart the first computing process when the closing movement is stopped.

The control unit comprises a computing resource like a computing processor, a memory, or the like, that provides sufficient computing capacity for controlling the closing movement, while the computing capacity may be used for other functions, when the closure member is not performing a closing movement. Thus, the computing capacity may not need to be selected excessively large to ensure safe control of the closing movement. The processing capacity may be selected to meet computing requirements for performing basic functions and control of the closing movement, while processing capacity available when the closure member is not closing may be used for other functions.

The computing capacity may be needed during a whole closing movement or may be needed only during a part of the closing movement. In particular, when the closure member uncovers a large part of the opening in the roof, there may be a negligible chance for a sensitive object to be pinched and clamped between an edge of the opening and the closure member. In an embodiment, the algorithm for detecting a pinch may be operative only in an end part of the closing movement, for example.

In an embodiment of the control unit, the second computing process is configured to detect an unintended change in said closing movement of the closure member. In another embodiment, however, the processing capacity may be used for performing other occasional functions. For example, the method for detecting the unintended change in closing movement may use a reference dataset to compare a sensed value of a property to an ordinary value of such property, wherein the unintended change may be detected when the sensed value and the ordinary value deviate too much. Such a reference dataset may need an update occasionally. Performing such an update may require additional processing capacity, wherein providing increased processing capacity for such occasional processing would be cost-ineffective. Instead, another computing process may occasionally be interrupted to enable such occasional update.

In an embodiment of the control unit, the first computing process is configured to execute a function related to the operation of the open roof assembly. For example, instead of an occasional update of the reference dataset as above mentioned, the reference dataset may be updated with every opening movement and/or with every closing movement of the closure member. In such an exemplary embodiment, a change in the closing movement may be detected within a first boundary. When a predetermined condition is met, a computing process for the update of the reference dataset may be interrupted before it actually starts or after it has started. Thus, more computing capacity of the computing resource remains available, which enables to execute a same algorithm at a higher speed or another—faster or more accurate—algorithm for detecting the change in closing movement within a second boundary, wherein the second boundary is more stringent than the first boundary. The first and second boundary may define a maximum exerted force on an object having a predefined spring rate, for example. In another example, the boundary may define a time limit, a torque limit, or any other suitable limit.

In an embodiment of the control unit, the first computing process is configured to execute a function unrelated to the operation of the closure member of the open roof assembly. An open roof assembly may comprise further components for performing functions unrelated to the closure member like a sensor for detecting an condition in a passenger compartment or a condition exterior of the vehicle. Such a sensor or further component may need a computing process to perform the related function, e.g. for interpreting a sensor signal, for deciding on how to respond to a detected condition or for controlling operation of a related actuator. Many of such functions are not time-critical and may be postponed, i.e. interrupted before start or after start, until a relevant part of the closing movement of the closure member has completed. Hence, a computing resource may be functional to support and provide the function of the further component, unless the closure member is performing a closing movement.

In an embodiment of the control unit, the control unit is configured to select the first computing process from a number of running computing processes. As multiple computing processes may be running concurrently, one or more computing processes may be interrupted. In this embodiment, the control unit is configured to select one or more computing processes based on any suitable criterion. Such criterion may include a suitability for interruption or an amount of computing power becoming available during the interruption, for example. Further, in view of the computing power needed, one or more processes may be selected and interrupted. Next to interruption of running computing processes, scheduled computing processes may be interrupted even before such computing processes have actually started by rescheduling such computing processes to a later or an earlier point in time.

In this embodiment, the control unit may apply a simple algorithm to select and interrupt one or more running computing processes or the control unit may be configured to run an artificial intelligence (AI) algorithm for selecting and interrupting computing processes taking into account instant conditions in view of results from previous interruptions, for example. In an embodiment with the simple algorithm on the other hand, any running computing process may be interrupted except for the computing processes actually needed for performing the closing movement.

In an embodiment of the control unit, the computing resource is at least one of a processor and a memory. Both processor and memory may limit the computing power (capacity) available. For example, updating a reference dataset may require temporarily storing a relatively large amount of data in a volatile memory before the amount of data is stored in a non-volatile memory. As a result, a smaller part of the volatile memory is available for another computing process.

In an aspect, an open roof assembly for mounting in a roof of a vehicle is provided. The open roof assembly comprises a moveably arranged closure member for covering or at least partly uncovering an opening in the roof of the vehicle. The open roof assembly further comprises an embodiment of the above-described control unit, wherein the control unit is configured to control at least a part of a closing movement of the closure member.

In a further aspect, a method of operating a movably arranged closure member of an open roof assembly is provided. In the method, a control unit performs the steps of executing a first computing process; interrupting the first computing process; executing a second computing process for controlling at least a part of a closing movement of the closure member; and restarting the first computing process after ending the closing movement of the closure member.

In an embodiment of the method, the second computing process is configured to detect an unintended change in said closing movement of the closure member.

In an embodiment of the method, the first computing process is configured to execute a function related to the operation of the open roof assembly.

In an embodiment of the method, the first computing process is configured to execute a function unrelated to the operation of the closure member of the open roof assembly. In a particular embodiment thereof, the first computing process is configured to process a sensor signal, wherein the sensor is configured to detect at least one of a condition of a passenger compartment of the vehicle and a condition of an exterior of the vehicle.

In an embodiment of the method, the step of executing a first computing process comprises executing a number of computing processes and the step of interrupting the first computing process comprises selecting the first computing process from the number of computing processes. In a particular embodiment thereof, two or more computing processes are interrupted.

In a further aspect, a computer-readable storage medium storing computer executable instructions for instructing a control unit to perform an embodiment of the above-described method is provided.

Further scope of applicability of the present invention will become apparent from the detailed description given hereinafter. However, it should be understood that the detailed description and specific examples, while indicating embodiments of the invention, are given by way of illustration only, since various changes and modifications within the scope of the invention will become apparent to those skilled in the art from this detailed description with reference to the appended schematical drawings.

DETAILED DESCRIPTION

Figure 1A:
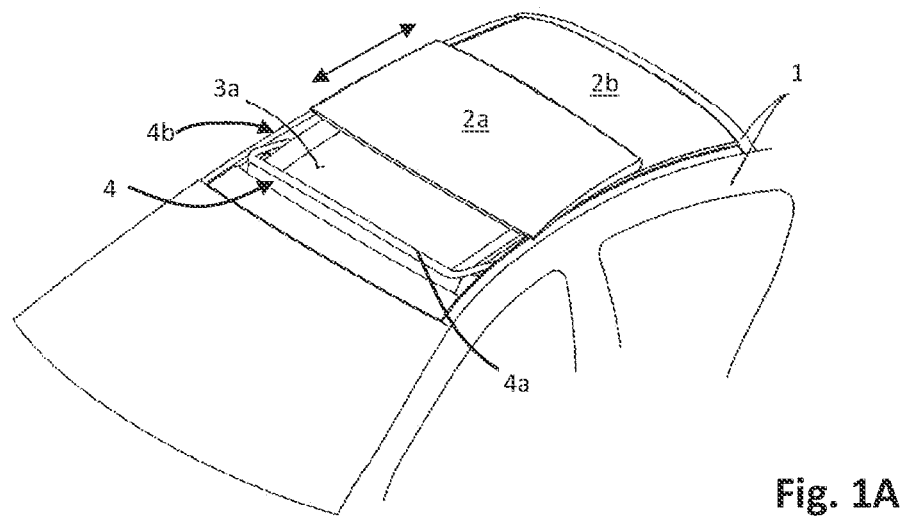
FIG. 1A shows a perspective view of a vehicle roof with an open roof assembly.

The present invention will now be described with reference to the accompanying drawings, wherein the same reference numerals have been used to identify the same or similar elements throughout the several views.

FIG. 1A illustrates a vehicle roof 1 having an open roof assembly arranged therein. The open roof assembly comprises a moveable panel 2*a* and a fixed panel 2*b*. The moveable panel 2*a* is also referred to as a closure member, since the moveable panel 2*a* is moveable over a first roof opening 3*a* such to enable to open and to close the first roof opening 3*a*. A wind deflector 4 is arranged at a front side of the first roof opening 3*a*.

In the illustrated embodiment, the moveable panel 2*a* may be in a closed position, which is a position wherein the moveable panel 2*a* is arranged over and closes the first roof opening 3*a* and thus usually is arranged in a plane of the vehicle roof 1. Further, the moveable panel 2*a* may be in a tilted position, which is a position wherein a rear end RE of the moveable panel 2*a* is raised as compared to the closed position, while a front end FE of the moveable panel 2*a* is still in the closed position. Further, the moveable panel 2*a* may be in an open position, which is a position wherein the moveable panel 2a is slid open and the first roof opening 3a is partly or completely exposed.

It is noted that the illustrated vehicle roof 1 corresponds to a passenger car. The present invention is however not limited to passenger cars. Any other kind of vehicles that may be provided with a moveable panel are contemplated as well.

Figure 1B:
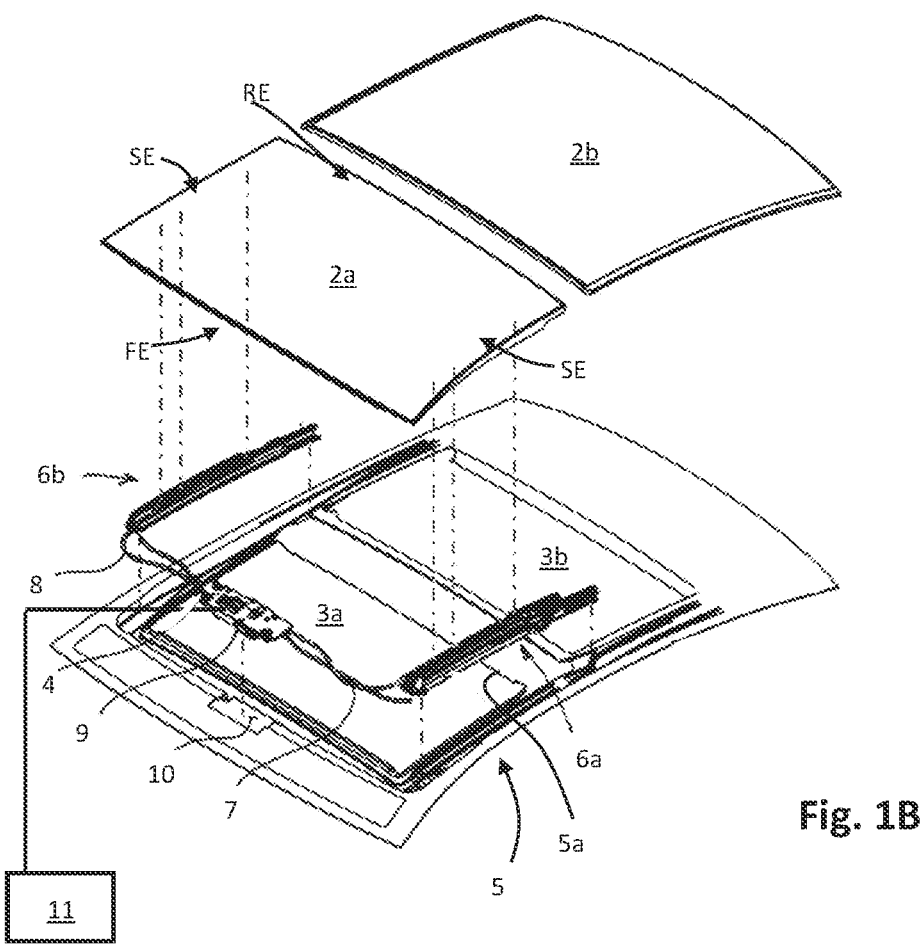
FIG. 1B shows an exploded view of the open roof assembly of FIG. 1A.

FIG. 1B illustrates the same vehicle roof as shown in FIG. 1A having panels 2a and 2b. In particular, while FIG. 1A shows the open roof assembly in the open position, FIG. 1B is an exploded view of the open roof assembly in a closed position. Further, in this exploded view of FIG. 1B, it is shown that there is a second roof opening 3b. The first and second roof openings 3a, 3b are provided in a frame 5 of the open roof assembly. An edge 5a of the frame 5 defines the first roof opening 3a.

The second roof opening 3b is arranged under the fixed panel 2b such that light may enter a vehicle interior passenger compartment through the fixed panel 2b, presuming that the fixed panel 2b is a glass panel or a similarly transparent panel, for example made of a plastic material or any other suitable material. The second roof opening 3b with a transparent or translucent fixed panel 2b is optional and may be omitted in another embodiment of the open roof assembly.

The wind deflector 4 is commonly a flexible material, e.g. a woven or non-woven cloth having through holes arranged therein or a web or net. The flexible material is supported by a support structure 4a, e.g. a bar-like or tube-like structure, which structure is hingedly coupled, directly or indirectly, to the frame 5 at a hinge 4b.

The wind deflector 4 is arranged in front of the first roof opening 3a and adapts air flow when the moveable panel 2a is in the open position. In its raised position, the wind deflector 4 reduces inconvenient noise due to air flow during driving. When the moveable panel 2a is in the closed position or in the tilted position, the wind deflector 4 is held down below the front end FE of the moveable panel 2a.

Usually, the wind deflector 4 is raised by a spring force when the moveable panel 2a slides to an open position and the wind deflector 4 is pushed down by the moveable panel 2a when the moveable panel 2a slides back into its closed position. In FIG. 1A, the moveable panel 2a is shown in an open position and the wind deflector 4 is shown in a raised position. In FIG. 1B, the moveable panel 2a is shown in a closed position and the wind deflector 4 is correspondingly shown in a position in which it is held down.

FIG. 1B further illustrates a drive assembly having a first guide assembly 6a, a second guide assembly 6b, a first drive cable 7 and a second drive cable 8. The first and second guide assemblies 6a, 6b are arranged on respective side ends SE of the moveable panel 2a and may each comprise a guide and a mechanism. The guide is coupled to the frame 5, while the mechanism comprises moveable parts and is slideably moveable in the guide. The first and the second drive cables 7, 8 are provided between the mechanisms of the respective guide assemblies 6a, 6b and a electric motor 9.

The drive cables 7, 8 couple the electric motor 9 to the mechanisms of the respective guide assemblies 6a, 6b such that upon operating the electric motor 9, the mechanisms start to move. In particular, a core of the drive cable 7, 8 is moved by the electric motor 9 such to push or pull on the mechanisms of the respective guides 6a, 6b. Such a drive assembly is well known in the art and is therefore not further elucidated herein. Still, any other suitable drive assembly may be employed as well without departing from the scope of the present invention. Moreover, in a particular embodiment, an electric motor may be operatively arranged between the respective guides and the respective mechanisms of the guide assemblies 6a, 6b and, in such embodiment, a drive assembly may be omitted completely.

In the illustrated embodiment, the guide assemblies 6a, 6b may start movement with raising the rear end RE of the moveable panel 2a, thereby bringing the moveable panel 2a in the tilted position. Then, from the tilted position, the guide assemblies 6a, 6b may start to slide to bring the moveable panel 2a in the open position. The present invention is however not limited to such embodiment. For example, in another embodiment, the moveable panel 2a may be moveable to a tilted position by raising the rear end RE, while an open position is reached by first lowering the rear end RE and then sliding the moveable panel 2a under the fixed panel 2b or any other structure or element provided behind the rear end RE of the moveable panel 2a. In further exemplary embodiments, the moveable panel 2a may be merely moveable between a closed position and a tilted position or between a closed position and an open position.

In the illustrated embodiment, the electric motor 9 is mounted near or below the front end FE of the moveable panel 2a at a recess 10. In another embodiment, the electric motor 9 may be positioned at any other suitable position or location. For example, the electric motor 9 may be arranged near or below the rear end RE of the moveable panel 2a or below the fixed panel 2b.

A control module 11 is schematically illustrated and is operatively coupled to the electric motor 9. The control module 11 may be any kind of processing module, either a software controlled processing module or a dedicated processing module, like an ASIC, which are both well known to those skilled in the art. The control module 11 may be a stand-alone control module or it may be operatively connected to another control module, like a multipurpose, generic vehicle control module. In yet another embodiment, the control module 11 may be embedded in or be part of such a generic vehicle control module. Essentially, the control module 11 may be embodied by any control module suitable for, capable of and configured for performing operation of the electric motor 9 and thus the moveable roof assembly.

Figure 2A:
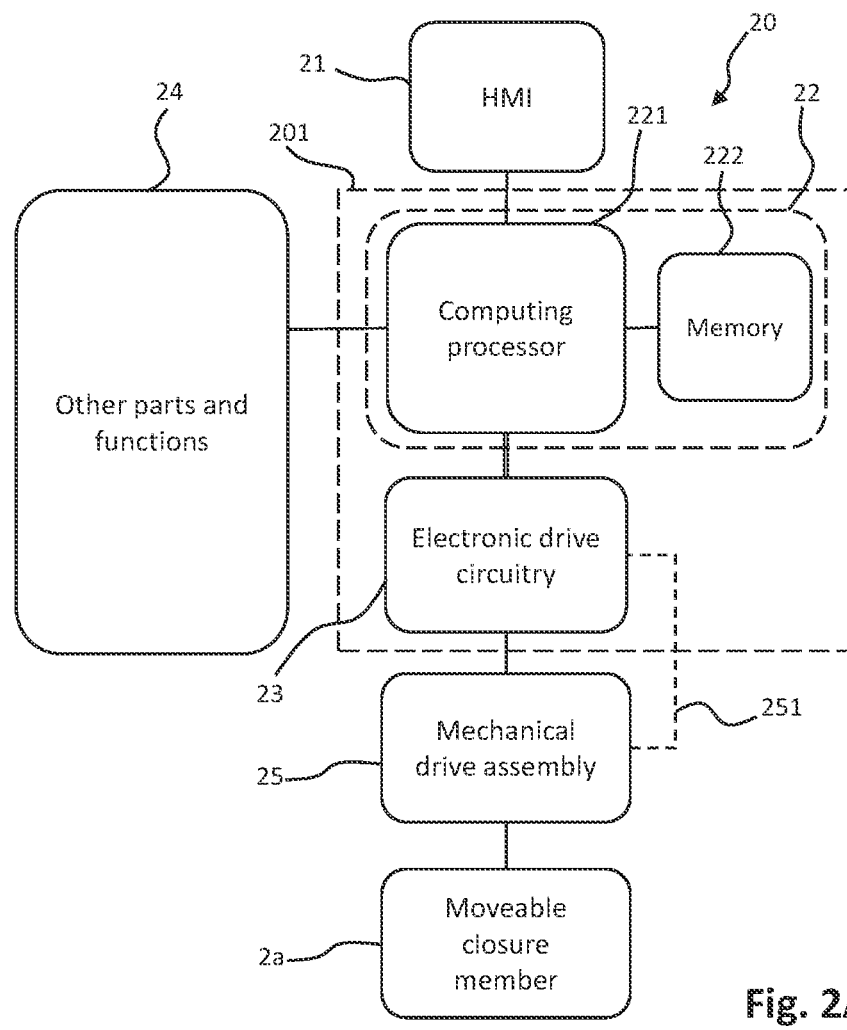
FIG. 2A shows a diagram illustrating an embodiment of a control unit for use with an open roof assembly.

FIG. 2A illustrates an embodiment of a control system 20 of an open roof assembly. The control system 20 comprises a human-machine interface (HMI) 21 operatively coupled to a control unit 22. Further, an electronic drive circuitry 23 and another controllable element 24 is operatively coupled to the control unit 22. The electronic drive circuitry 23 is coupled to a mechanical drive assembly 25 which is mechanically coupled to a moveable closure member 2a.

The mechanical drive assembly 25 may comprise one or more sensors for detecting one or more parameters suitable for use in controlling a motion of the closure member. A sensor signal 251 output by the one or more sensors is fed back to the electronic drive circuitry 23. Alternatively or additionally, the sensor signal 251 may be fed to the control unit 22.

The closure member 2a is mechanically operated through the mechanical drive assembly 25, which may comprise the guide assemblies 6a, 6b, the drive cables 7,8 and the electric motor 9 as illustrated in FIG. 1B. Further, as mentioned above, the mechanical drive assembly 25 may comprise sensors. For example, the electric motor 9 may be provided with Hall sensors for determining a rotation speed and an amount of rotations for controlling a motion of the closure member 2a. Such control of motion of the closure member 2a in response to certain sensors is well-known in the art and is therefore not further elucidated herein. It is noted that alternatively or additionally, other sensors may be applied as well, as apparent to those skilled in the art.

The electric motor and optional other electric components are supplied with a supply voltage and supply current by the electronic drive circuitry 23. For example, one or more relays may be comprised in the electronic drive circuitry 23 for switching the electric motor on and off. In another embodiment, an H-bridge of switching elements, such as transistors like IGBT's or MOSFET transistors, may be used to perform a pulse-width modulation control of the electric motor to enable speed control, for example. Suitable embodiments of an electronic drive circuitry 23 are well-known in the art and are therefore not further elucidated herein.

The electronic drive circuitry 23 is controlled by the control unit 22. The control unit 22 is configured to determine if and when the closure member 2a is to move and when to stop a motion, for example. Corresponding instructions are output to the electronic drive circuitry 23. If the sensor signal 251 is output to the electronic drive circuitry 23, the electronic drive circuitry 23 may provide the same or a corresponding signal to the control unit 22 or the electronic drive circuitry 23 may interpret the sensor signal 251 and provide other data and information regarding the motion of the closure member 2a to the control unit 22. Further, data regarding the operation of the electronic drive circuitry 23 itself may be supplied to the control unit 22 to enable the control unit 22 to improve or adapt the control instructions output to the electronic drive circuitry 23.

The control unit 22 may comprise many electronic components and may be embodied in many forms. A well-known control unit 22 comprises computing resources, like a computing processor 221 and a volatile memory 222, wherein the volatile memory 222 is operatively coupled to the computing processor 221 for performing computing processes in a manner well-known in the art. Further electronic components may be a non-volatile memory for storing data or for storing instructions for the computer computing processor to execute. Many other kind-kinds of components may be provided as well as apparent to those skilled in the art.

The computing processor 221 may take one of many forms, including general-purpose processors or one of a more sophisticated processor type. As used herein, the computer computing processor 221 is selected to be suitable for executing, and is configured to execute, at least two different computing processes. Such two different computing processes may both relate to the control of motion of the moveable closure member 2a or the two different computing processes may be unrelated, wherein one may relate to the motion control of the closure member 2a and the other one relates to an operation of the other controllable element 24, which may be a lighting element, an air quality sensor device, a multimedia system, or the like.

The HMI 21 may comprise buttons or a touchscreen, for example, to enable a user to operate the open roof assembly, in particular to operate the closure member 2a. The closure member 2a may be moved to an open position or to a closed position. In the closed position, the roof is closed, while in the open position an opening to an environment of the vehicle is provided through the roof of the vehicle, allowing a free flow of air between the environment and an interior passenger compartment of the vehicle, for example. Other functions than the operation of the closure member 2a may be controllable from the HMI 21 as well. For example, if the other controllable element 24 comprises a lighting element, the HMI 21 may offer a button to switch the lighting element on or off.

The HMI 21 may be a local user interface, i.e. a panel with switches and knobs, a touchscreen, or the like, in the vehicle, in particular in the passenger compartment of the vehicle. Alternatively or additionally, the HMI 21 may comprise a wireless-connection interface such that a remote control connection may be established. For example, a smart phone may establish a Bluetooth connection or a connection through Internet. A software application running on the smart phone may then provide the user interface, enabling operation from a distance. Moreover, the control system 20 may be operated without the operating user being able to oversee the operation.

For sake of completeness, it is noted that the indicated parts and functional units, like the electronic drive circuitry 23 and the HMI 21 may comprise a number of components that may not be housed or grouped as such. Multiple functional units and parts may be housed together and any functional unit may be split into multiple sub-units and housed as sub-units. For example, in an embodiment, the control unit 22 and the electronic drive circuitry 23 may be housed as a single electronic unit 201. In such embodiment, a remote-HMI connection unit may be provided in such electronic unit 201, while a physical HMI 21 may be provided separately.

Figure 2B:
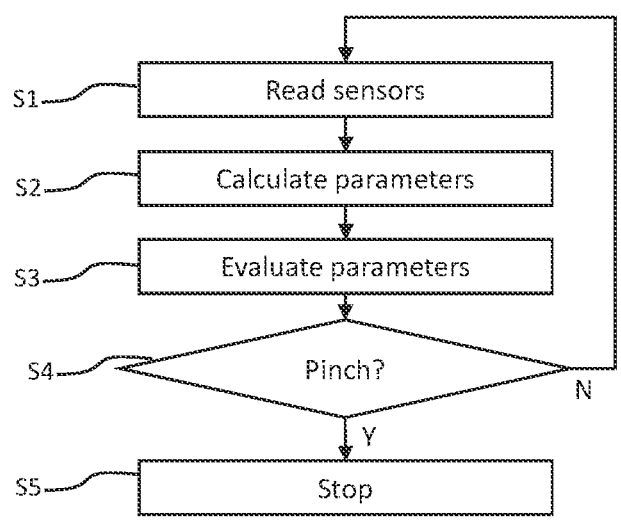
FIG. 2B shows a flow diagram illustrating a process for detecting a pinch of a moveable closure member in motion.

FIG. 2B illustrates an exemplary method controlled by the control unit 22 and comprising computing processes executed by the computing resources of the control unit 22. The illustrated method is configured to prevent a pinch occurrence, wherein an object is pinched with a (too) large force between the closure member 2a and the edge 5a of the roof opening 3a (see FIG. 1A), in particular during a closing movement. To prevent an excessive pinch force, timely detection of an occurring pinch is important. Thereto, one or multiple sensors are read in a first step S1 of the method. Such sensors are mentioned hereinabove and may include Hall-sensors on the electric motor driving the motion of the closure member, position sensors, supply current sensors, torque sensors, and the like, as apparent to those skilled in the art. A reading of the sensors as obtained in the first step S1, is analysed and used for calculating relevant parameters in a second step S2. For example, from a reading of the Hall sensors and a reading of the supply current, a speed of the closure member may be determined and a torque or force exerted by the closure member may be derived.

In a third step S3, the derived parameters may be evaluated. For example, the derived parameters may be compared to previously determined reference values of such parameters. If a significant difference between a reference value and the actual parameter exists, this may be used as an indicator for an occurring pinch. In a fourth step S4, it is decided whether a pinch has actually occurred. If no pinch is detected and decided, the method returns to the first step S1. If a pinch is detected and decided, the motion of the closure member may be stopped or reversed in a fifth step S5.

An execution time needed for executing every one of the steps S1-S4 is dependent on the computing power or computing capacity available. The shorter the execution time, the higher a loop frequency (i.e. the number of times the loop of the four steps S1-S4 is executed per second) and the sooner a pinch may be detected. The sooner a pinch is detected, the smaller the exerted force of the closure member on the pinched object.

Hence, it is desired to have an optimal computing power available at least during a closing movement or any other movement that may incur a pinch. On the other hand, from a cost perspective, it may be desired to provide for a cost-effective computing resources and, therefore, it is not desired to apply computing resources having an overly large computing power, which may not be used other than for control of the closing movement.

Figure 3A:
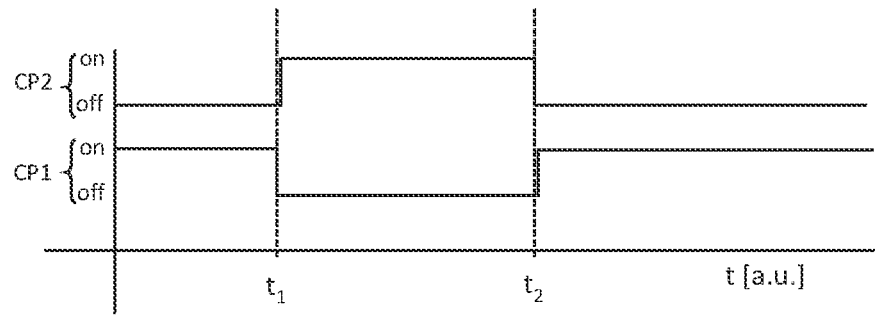
FIG. 3A shows a timing diagram illustrating a first embodiment of a method of operating a movably arranged closure member of an open roof assembly.

FIG. 3A illustrates a timing diagram of a first computing process CP1 and a second computing process CP2. The first computing process CP1 is running ('on') before time $t_1$. The second computing process CP2 is a computing process relating to a closing movement, for example a computing process for detecting a pinch, and is not running before time $t_1$.

At time $t_1$, a closing movement is started, either through the HMI by an operating user or by an automatic process, e.g. a time-scheduled closing process or a closing process in response to a sensed condition like detection of rainfall. At time $t_1$, the running first computing process CP1 is interrupted (on→off) and the second computing process CP2 is started (off→on). By interrupting the first computing process CP1, the computing power needed for such process, is freed and a maximum processing power becomes available for the second computing process CP2.

At time $t_2$, the closing movement is finished and the second computing process CP2 is terminated. Then the first computing process CP1 may be restarted.

The kind of computing process of the first computing process CP1 is not relevant other than that the first computing process CP1 should not be time-critical and be suitable to be interrupted. For example, a computing process relating to an air quality sensor may be interrupted for a closing movement, as the air quality may be presumed to change only slowly and no immediate danger or damage may be expected if the air quality is not determined for such a short period of time.

Figure 3B:
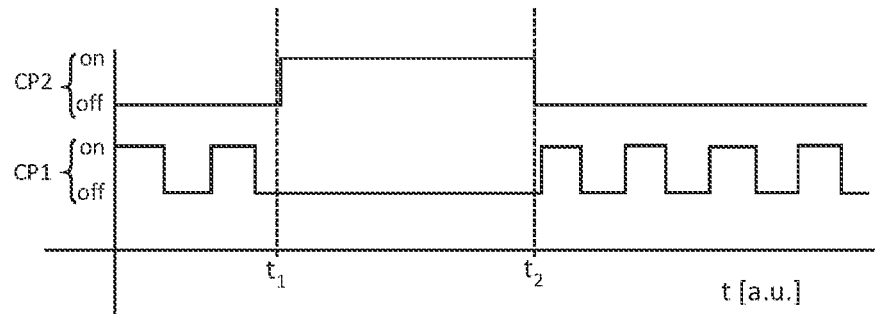
FIG. 3B shows a timing diagram illustrating a second embodiment of a method of operating a movably arranged closure member of an open roof assembly.

FIG. 3B shows a timing diagram of a second embodiment of the method, wherein the first computing process CP1 is not a continuous process, but an intermittent computing process, regularly switching on and off. As shown in FIG. 3B, at time $t_1$, the first computing process CP1 is already off and does need to be interrupted as such. Still, in order to prevent a loss of computing power available for the second computing process CP2, the intermittent first computing process CP1 is interrupted in the sense that it is prevented from restarting, while the second computing process CP2 is running, i.e. after time $t_1$ and before time $t_2$. As soon as the second computing process CP2 has stopped and is terminated, the intermittent first computing process CP1 is restarted.

Figure 3C:
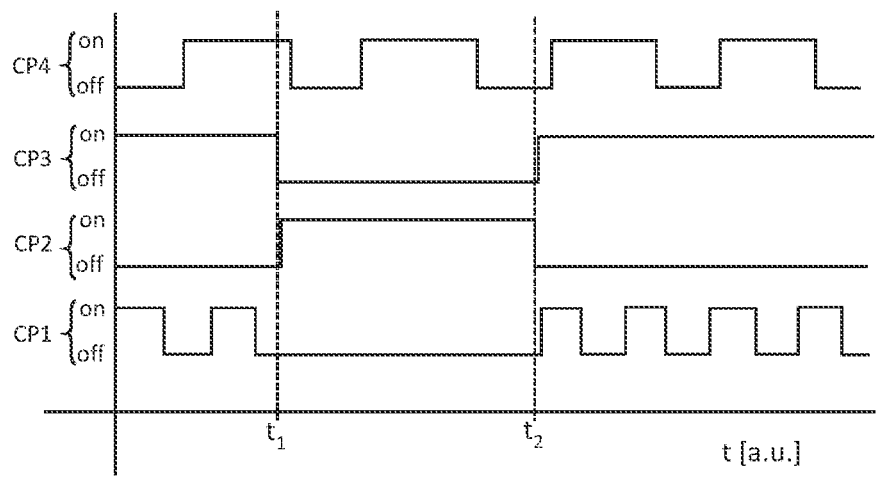
FIG. 3C shows a timing diagram illustrating a third embodiment of a method of operating a movably arranged closure member of an open roof assembly.

FIG. 3C shows a timing diagram of a third embodiment of the method, wherein more than one computing process is running before time $t_1$. In particular, an intermittent first computing process CP1, a continuous third computing process CP3 and an intermittent fourth computing process CP4 are running before time $t_1$.

At time $t_1$, the closing movement is started. The first computing process CP1 is interrupted such that it does not restart while the second computing process CP2 relating to the closing movement is terminated. The continuous third computing process is interrupted at time $t_1$, as well.

The fourth computing process CP4 is however not interrupted. This may be due to a number of causes. For example, in an embodiment, the fourth computing process cannot be interrupted, e.g. because it relates to the operation of the closure member or it may relate to audio or video playback, which is preferably not interrupted in view of user experience. In another embodiment, it has been determined that interrupting the first and the third computing processes CP1, CP3 provides sufficient computing power for executing the second computing process CP2 such that interrupting the fourth computing process CP4 will not further improve a pinch detection time. In the latter embodiment, the control unit may be configured to select the computing processes to be interrupted based on predetermined criteria. For example, a priority may be assigned to each running computing process, and the computing process having the lowest priority is interrupted first. This selection process may be repeated until sufficient computing power is available for the second computing process CP2.

Figure 4A:
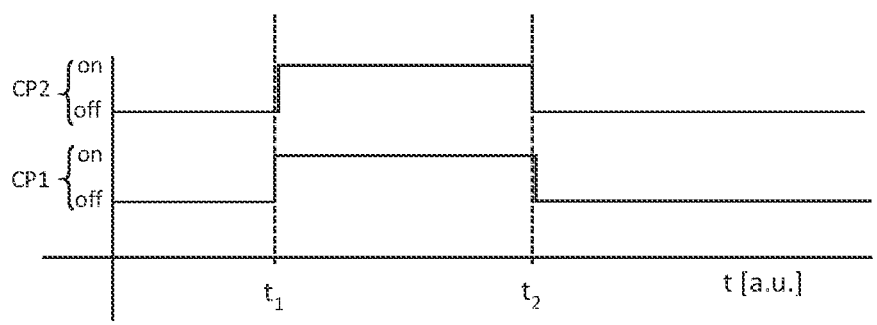
FIG. 4A shows a timing diagram illustrating a first mode of a fourth embodiment of a method of operating a movably arranged closure member of an open roof assembly.
Figure 4B:
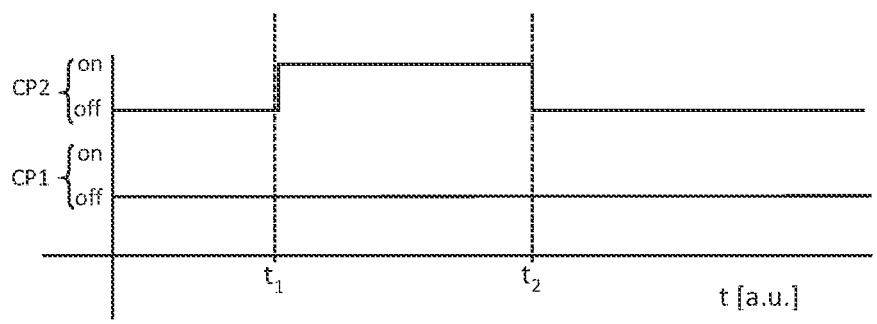
FIG. 4B shows a timing diagram illustrating a second mode of the fourth embodiment of FIG. 4A.

FIGS. 4A and 4B illustrate a fourth embodiment, wherein two modes are provided. FIG. 4A shows a timing diagram of the first mode and FIG. 4B shows a timing diagram of the second mode.

In the first mode illustrated in FIG. 4A, a first computing process CP1 is started with a second computing process CP2. For example, the second computing process CP2 may relate to detecting a pinch as above-described, while the first computing process CP1 may relate to detecting and storing one or more parameter values during a closing movement for later use as reference values as above described. Such detection and storing of reference values may be performed each time the closure member is in a closing movement or may be performed on a regular basis or in response to occurrence of a predetermined condition.

In the first mode, the first computing process CP1 requires processing power and, thus, less computing power of the computing resources is available for the second computing process CP2. Assuming a method as described in relation to and shown in FIG. 2B, the reduced available computing power results in a lower loop frequency and, therefore, a slower detection of a pinch occurrence.

Depending on conditions, the pinch detection may be desired or required to be faster. Under such conditions, the second mode may be applied. In the second mode, the first computing process CP1 is interrupted before it is actually started similar to the second embodiment according to FIG. 3B. The first computing process CP1 is in this case considered a latent computing process that is scheduled to start with the second computing process CP2, when the closure member is performing a closing movement. However, in the second mode, the latent first computing process CP1 is interrupted and therefore does not start to require any computing power. The second computing process CP2 has more computing power available and, as an example, a loop frequency of the method according to FIG. 2B will be increased. It is noted that, in a practical embodiment, it has been shown that a loop execution time, i.e. time needed for executing every one of the steps S1-S4 of FIG. 2B, may be about 7 ms in the first mode and may be reduced to about 1 ms in the second mode.

With respect to the conditions that may determine the selection of either the first mode or the second mode, it is noted that increased requirements may be legally applicable if the closure member is operated in an unsupervised manner. For example, for a remote-controlled operation, it may be considered that such operation enables and allows an operator to perform a closing movement without overseeing the closing operation. In such conditions, a more stringent pinch detection may be selected. The same may apply to a situation in which the closure member automatically closes, i.e. in response to a condition detected by a sensor or determined by a timer, or the like. In a practical embodiment, the first mode may be selected when the vehicle is moving, i.e. is being driven so at least a driver is present to oversee the closing movement, and the second mode may be selected if the vehicle is parked. Similar considerations may be taken into account to define suitable conditions for applying either the first mode or the second mode.

More technical considerations may be taken into account as well. For example, the second mode may be considered to be the standard mode, while the first mode is only selected, when stored reference values deviate too much from the corresponding parameter values measured during one or more recent closing movements. Thus, only in a small number of all closing movements, the first mode is selected. In a particular embodiment thereof, the first mode may be only selected if the closure member is operated from the local HMI, for example, to ensure that the closing movement is supervised.

Figure 5A:
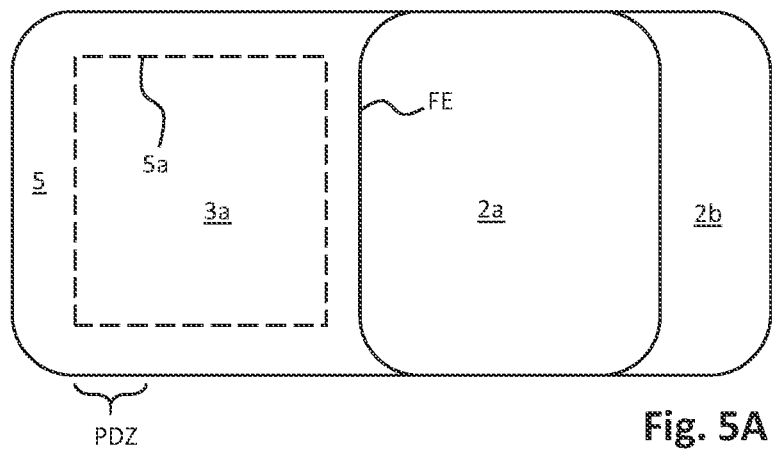
FIG. 5A shows a top view of an open roof assembly comprising a moveably arranged closure member in a first state.
Figure 5B:
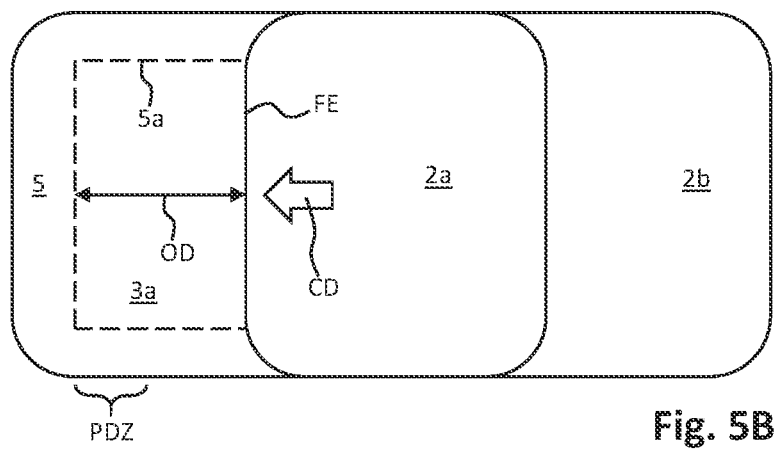
FIG. 5B shows a top view of an open roof assembly comprising a moveably arranged closure member in a second state.
Figure 5C:
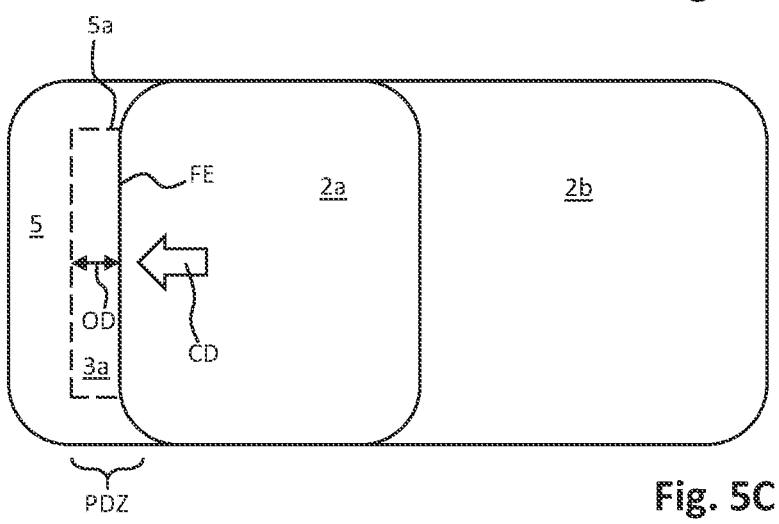
FIG. 5C shows a top view of an open roof assembly comprising a moveably arranged closure member in a third state.

FIGS. 5A-5C illustrate an embodiment of an open roof assembly, wherein a running computing process is only interrupted during a part of the closing motion of the moveable closure member 2a. FIGS. 5A-5C show the frame 5 supporting the moveable closure member 2a and the fixed panel 2b, e.g. a glass panel. The opening 3a is arranged in the frame 5, encircled by the frame edge 5a. The closure member 2a comprises the front edge FE.

In FIG. 5A, the moveable closure member 2a is in an open position, wherein the opening 3a is completely uncovered. From this open position, a closing movement may be initiated and after a first part of the closing motion in a closing direction CD, the closure member 2a arrives at the position shown in FIG. 5B. At this position, the closure member 2a is still in an open position. An open distance OD is defined as a distance between the front edge FE and a front part of the frame edge 5a. The open distance OD may be considered to be relatively large such that pinch detection may be omitted.

Continuing the closing movement in the closing direction CD, the front edge FE of the closure member 2a approaches the front part of the frame edge 5a further, reducing the open distance OD and arriving in a pinch detection zone PDZ, as illustrated in FIG. 5C. The pinch detection zone PDZ is considered the zone where the open distance OD is so small that a pinch may occur, trapping an object between the front edge FE and the front part of the frame edge 5a. A size of the pinch detection zone PDZ may be determined by legal requirements or may be selected based on other considerations.

In the pinch detection zone PDZ, a computing process for timely detection of a pinch may be started, while during a closing movement of the closure member 2a outside the pinch detection zone PDZ the pinch detection may be omitted.

Figure 6A:
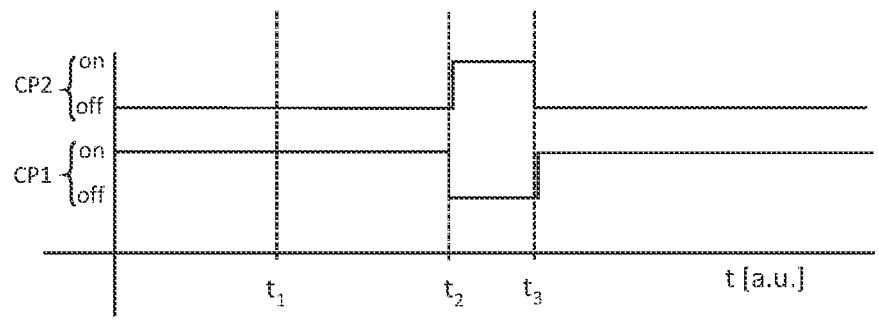
FIG. 6A shows a timing diagram illustrating a fifth embodiment of a method of operating a movably arranged closure member of an open roof assembly.
Figure 6B:
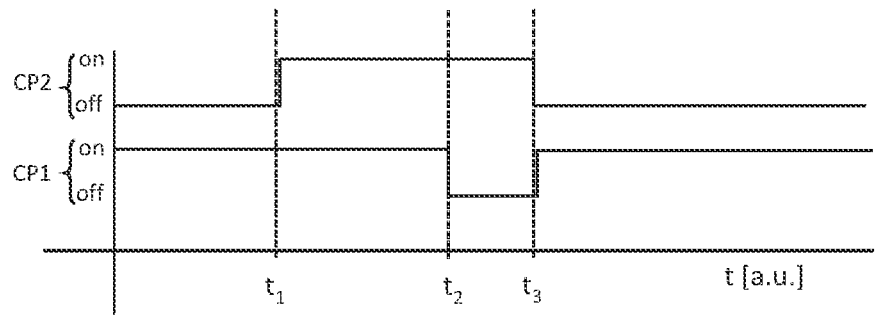
FIG. 6B shows a timing diagram illustrating a sixth embodiment of a method of operating a movably arranged closure member of an open roof assembly.
Figure 6C:
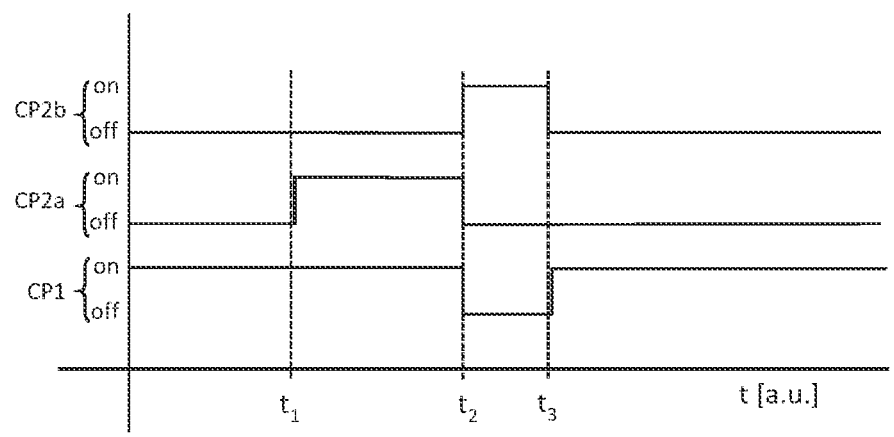
FIG. 6C shows a timing diagram illustrating a seventh embodiment of a method of operating a movably arranged closure member of an open roof assembly.

FIGS. 6A-6C each illustrate a timing diagram of an embodiment of a pinch detection method suitable for use with the open roof assembly according to FIGS. 5A-5C.

In the embodiment of FIG. 6A, at time $t_1$, a closing movement is started. The front edge of the closure member is not in the pinch detection zone, so no pinch detection related second computing process CP2 is started. A running first computing process CP may continue to run.

At time $t_2$, the front edge of the closure member enters the pinch detection zone and a pinch detection process is started as the second computing process CP2. In order to provide for sufficient processing power, the running first computing process CP1 is interrupted from time $t_2$.

At time $t_3$, the closure member arrives at the closed position and the closing movement is stopped. Correspondingly, the second computing process CP2 is stopped and the first computing process CP1 may be restarted.

In the embodiment of FIG. 6B, at time $t_1$, a closing movement is started. The front edge of the closure member is not in the pinch detection zone. A pinch detection related second computing process CP2 is started, while a running first computing process CP may continue to run. As a result, the pinch detection may be a little slower, but chances of occurrence of a pinch with a high force are negligible in view of the relatively large open distance, i.e. distance between the front edge of the closure member and the front part of the frame edge 5a.

At time $t_2$, the front edge of the closure member enters the pinch detection zone and the pinch detection process is configured to be more stringent. Therefore, the second computing process CP2 is to run faster, requiring more computing power. To provide sufficient processing power, the running first computing process CP1 is interrupted from time $t_2$.

At time $t_3$, the closure member arrives at the closed position and the closing movement is stopped. Correspondingly, the second computing process CP2 is stopped and the first computing process CP1 may be restarted.

In the embodiment of FIG. 6C, at time $t_1$, a closing movement is started. The front edge of the closure member is not in the pinch detection zone. A standard-level pinch detection computing process CP2a is started, while a running first computing process CP may continue to run.

At time $t_2$, the front edge of the closure member enters the pinch detection zone and the pinch detection process is configured to be more stringent. Therefore, the standard-level pinch detection computing process CP2a is stopped and a higher-level pinch detection computing process CP2b is started, requiring more computing power. The higher-level pinch detection computing process CP2b may apply another algorithm compared to the standard-level pinch detection computing process CP2a, for example. To provide sufficient processing power, the running first computing process CP1 is interrupted from time $t_2$.

At time $t_3$, the closure member arrives at the closed position and the closing movement is stopped. Correspondingly, the second computing process CP2 is stopped and the first computing process CP1 may be restarted.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in expectedly any appropriately detailed structure. In particular, features presented and described in separate dependent claims may be applied in combination and any advantageous combination of such claims are herewith disclosed.

Further, it is contemplated that structural elements may be generated by application of three-dimensional (3D) printing techniques. Therefore, any reference to a structural element is intended to encompass any computer executable instructions that instruct a computer to generate such a structural element by three-dimensional printing techniques or similar computer controlled manufacturing techniques. Furthermore, any such reference to a structural element is also intended to encompass a computer readable medium carrying such computer executable instructions.

Further, the terms and phrases used herein are not intended to be limiting, but rather to provide an understandable description of the invention. The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly.

The invention being thus described it is apparent that the same may be varied in many ways. Such variations are not to be regarded as a departure from the spirit and scope of the invention, and all such modifications as would be apparent to one skilled in the art are intended to be included within the scope of the following claims.

What is claimed is:

1. A control unit for operating a moveably arranged closure member of an open roof assembly for a vehicle, the control unit comprising at least one computing resource configured to execute a computing process in a user supervised mode, the control unit being configured to interrupt, for initiating an unsupervised mode, a running computing process to free computing power of the at least one computing resource used for the interrupted running computing process, and to execute a pinch detection process in the unsupervised mode for controlling at least a closing part of a closing movement of the closure member more quickly and/or stringent than in the user supervised mode, by using at least part of the freed computing power of the at least one computing resource for the pinch detection process in the unsupervised mode, and to restart the interrupted running computing process using the at least one computing resource when the closing movement of the closure member is stopped.

2. The control unit according to claim 1, wherein the pinch detection process is configured to detect an unintended change in said closing movement of the closure member.

3. The control unit according to claim 1, wherein the computing process is configured to execute a function related to operation of the open roof assembly.

4. The control unit according to claim 1, wherein the computing process is configured to execute a function unrelated to operation of the closure member of the open roof assembly.

5. The control unit according to claim 4, and further comprising a sensor configured to detect at least one of a condition of a passenger compartment of the vehicle and/or a condition of an exterior of the vehicle, and wherein the computing process is configured to process a sensor signal from the sensor.

6. The control unit according to claim 1, wherein the control unit is configured to select the computing process from a number of running computing processes.

7. The control unit according to claim 1, wherein the at least one computing resource is at least one of a processor and a memory.

8. An open roof assembly for mounting in a roof of a vehicle, the open roof assembly comprising:
a moveably arranged closure member for covering or at least partly uncovering an opening in the roof of the vehicle; and
a control unit comprising at least one computing resource configured to execute a computing process in a user supervised mode, the control unit being configured to interrupt, for initiating an unsupervised mode, a running first computing process to free computing power of the at least one computing resource used for the interrupted running computing process, and to execute a pinch detection process in the unsupervised mode for controlling at least a closing part of a closing movement of the closure member more quickly and/or stringent than in the user supervised mode, by using at least part of the freed computing power of the at least one computing resource for the pinch detection process in the unsupervised mode, and to restart the interrupted running computing process using the at least one computing resource when the closing movement of the closure member is stopped.

9. A method of operating a movably arranged closure member of an open roof assembly of a vehicle, wherein a control unit comprising at least one computing resource for executing at least one computing process performs steps of:
executing a computing process in a user supervised mode; and
interrupting the computing process, for initiating an unsupervised mode, to free computing power of the at least one computing resource used for the interrupted computing process;
executing a pinch detection process for controlling at least a closing part of a closing movement of the closure member more quickly and/or stringent than in the user supervised mode, by using at least part of the freed computing power of the at least one computing resource for the pinch detection process in the unsupervised mode; and
restarting the interrupted computing process using the at least one computing resource, when the closing movement of the closure member is stopped.

10. The method according to claim 9, wherein executing the pinch detection process comprises detecting an unintended change in said closing movement of the closure member.

11. The method according to claim 9, wherein executing the computing process comprises executing a function related to operation of the open roof assembly.

12. The method according to claim 9, wherein executing the computing process comprises executing a function unrelated to operation of the closure member of the open roof assembly.

13. The method according to claim 12, wherein executing the computing process comprises processing a sensor signal from a sensor configured to detect at least one of a condition of a passenger compartment of the vehicle and/or a condition of an exterior of the vehicle.

14. The method according to claim 9, wherein executing the computing process comprises executing a number of computing processes and wherein interrupting the computing process comprises selecting the computing process to be interrupted from the number of computing processes.

15. A non-transitory, tangible computer-readable storage medium storing computer executable instructions when executed by at least one computing resource having a processor of a control unit for controlling movement of a closure member of an open roof assembly of a vehicle, the executable instructions configured to perform a method to operate the closure member comprising:
executing a computing process in a user supervised mode;
interrupting the computing process, for initiating an unsupervised mode, to free computing power of the at least one computing resource used for the interrupted computing process;
executing a pinch detection process for controlling at least a closing part of a closing movement of the closure member more quickly and/or stringent than in the user supervised mode, by using at least part of the freed computing power of the at least one computing resource for the pinch detection process in the unsupervised mode; and restarting the interrupted computing process using the at least one computing resource, when the closing movement of the closure member is stopped.

16. The non-transitory, tangible computer-readable storage medium according to claim 15, wherein executing the pinch detection process comprises detecting an unintended change in said closing movement of the closure member.

17. The non-transitory, tangible computer-readable storage medium according to claim 15, wherein executing the computing process comprises executing a function related to operation of the open roof assembly.

18. The non-transitory, tangible computer-readable storage medium according to claim 15, wherein executing the computing process comprises executing a function unrelated to operation of the closure member of the open roof assembly.

19. The non-transitory, tangible computer-readable storage medium according to claim 18, wherein executing the computing process comprises processing a sensor signal from a sensor configured to detect at least one of a condition of a passenger compartment of the vehicle and/or a condition of an exterior of the vehicle.

20. The non-transitory, tangible computer-readable storage medium according to claim 16, wherein executing the computing process comprises executing a number of computing processes and wherein interrupting the computing process comprises selecting the computing process to be interrupted from the number of computing processes.

* * * * *